United States Patent
Hempl

(10) Patent No.: US 8,321,176 B2
(45) Date of Patent: Nov. 27, 2012

(54) METHOD FOR DETERMINING A TWIST ANGLE

(75) Inventor: Martin Hempl, Winkelhaid (DE)

(73) Assignee: Siemens Aktiengesellschaft, München (DE)

( * ) Notice: Subject to any disclaimer, the term of this patent is extended or adjusted under 35 U.S.C. 154(b) by 215 days.

(21) Appl. No.: 12/865,211

(22) PCT Filed: Jan. 28, 2009

(86) PCT No.: PCT/EP2009/050930
§ 371 (c)(1),
(2), (4) Date: Jul. 29, 2010

(87) PCT Pub. No.: WO2009/095398
PCT Pub. Date: Aug. 6, 2009

(65) Prior Publication Data
US 2011/0010128 A1   Jan. 13, 2011

(30) Foreign Application Priority Data
Feb. 1, 2008   (DE) .......................... 10 2008 007 372

(51) Int. Cl.
*G06F 15/00* (2006.01)
*G01B 7/30* (2006.01)

(52) U.S. Cl. .......... 702/151; 702/145; 702/150; 477/91; 477/107; 477/110; 192/3.3

(58) Field of Classification Search ............. 702/145, 702/150, 151; 701/67; 192/3.3; 477/91, 477/107, 110
See application file for complete search history.

(56) References Cited

U.S. PATENT DOCUMENTS

| | | | |
|---|---|---|---|
| 5,239,490 A | 8/1993 | Masaki et al. | |
| 5,471,054 A | 11/1995 | Watanabe | |
| 7,234,578 B2 * | 6/2007 | Tsunekawa | 192/3.3 |
| 8,137,240 B2 * | 3/2012 | Humer et al. | 477/107 |

FOREIGN PATENT DOCUMENTS

| | | |
|---|---|---|
| DE | 19818799 A1 | 6/1999 |
| WO | WO 02/16881 A1 | 2/2002 |

* cited by examiner

Primary Examiner — Sujoy Kundu

(57) ABSTRACT

A method for determining an angle between a first shaft section and a second shaft section is provided. The 0° position of the first shaft section is determined by a first shaft signal, and the 0° position of the second shaft section is determined by a second shaft signal. The first shaft signal and the second shaft signal are subsequently each decomposed using Fourier analysis into frequency components of harmonic oscillations, wherein frequencies are calculated for the first shaft signal, and frequencies are calculated for the second shaft signal. The frequencies are each calculated as complex pointers from absolute value and phase of the order thereof wherein each pointer describes the angular velocity of the particular frequency. For each frequency, the particular angle of the complex number is then divided by the order, wherein standardized complex pointers are calculated. The standardized complex pointers are added complexly.

15 Claims, 3 Drawing Sheets

US 8,321,176 B2

METHOD FOR DETERMINING A TWIST ANGLE

CROSS REFERENCE TO RELATED APPLICATIONS

This application is the U.S. National Stage of International Application No. PCT/EP2009/050930, filed Jan. 28, 2009 and claims the benefit thereof. The International Application claims the benefits of German application No. 10 2008 007 372.5 DE filed Feb. 1, 2008. All of the applications are incorporated by reference herein in their entirety.

FIELD OF INVENTION

The invention relates to a method for determining an angle $\alpha$ between a first shaft section and a second shaft section.

BACKGROUND OF INVENTION

Clutches are used to transmit torque in machines with rotating shafts. It may then be necessary for the machine that the subshafts connected by the clutch are coupled to one another in their zero position without being twisted in relation to one another or that the angle of twist through which the two subshafts are twisted is known.

In the case of releasable clutches the angle of twist must be redetermined after each new coupling. Such releasable clutches are used for example in gas and steam turbine power plants (GUD), in which the gas turbine is connected to the steam turbine by way of a shaft. The releasable clutch is disposed here between the gas and steam turbines. The determination of the angle of twist between the subshafts is of particular importance for the overall process of the power plant installation.

Until now the following procedure has generally been followed to measure an angle of twist for rotating shafts: Two shafts are connected to one another at any angle by way of a releasable clutch. The 0° positions of both shafts are defined by means of a zero mark, e.g. a notch. The two notches are twisted in relation to one another and span the required clutch angle.

The notches are measured computationally by means of optical or inductive sensors, it being possible to capture a temporally resolved signal by this means. A signal profile is obtained for each of the two subshafts. The clutch angle can now be calculated for a known rotation speed from the time difference between the signals of the two shafts.

The accuracy of the measured signal is imprecise due to the narrow signal width of the usual notches in the shaft and due to interference signals that are also present in some instances. Errors of +/−30° in total can in fact occur.

For the automated calculation of the clutch angle, the angle of the respectively first orders from an order analysis is to be determined from the difference. In practice a commercially available 2-channel FFT or order analyzer is used for this purpose, calculating the respective 1× phase values from the time signals and the respective 0° notches, the difference between which is used to calculate the clutch angle.

One disadvantage of the known methods for determining an angle between a first shaft section and a second shaft section is in particular the high level of inaccuracy of the calculation result. Signal interference, caused by network fluctuations for example, also produces inadequate results.

SUMMARY OF INVENTION

The object of the invention is to propose a method, by means of which the angle can be calculated between a first shaft section and a second shaft section on a rotating machine with an inaccuracy less than +/−1°.

The object is achieved by a method, in which the 0° position of the first shaft section, to which the angle of twist relates, supplies a first shaft signal and the 0° position of the second shaft section supplies a second shaft signal. The first shaft signal and the second shaft signal are respectively decomposed by means of Fourier analysis into frequency components of harmonic oscillations. In this process frequencies $f_{n1}$ are formed for the first shaft signal and frequencies $f_{n2}$ are formed for the second shaft signal, the frequencies being represented respectively as complex pointers $z_n$ being made up of the absolute value $a_n$ and the phase $\phi_n$ of their order n and each pointer $z_n$ describing the angular velocity $\omega_n$ of the respective frequency $f_n$. For the frequencies $f_{n1}$ and the frequencies $f_{n2}$ the respective angles $\phi_n$ of the complex pointers $z_n$ are then divided respectively by their order n, with standardized complex pointers $N_n$ being formed, and the standardized complex pointers $N_n$ are added in a complex manner, so that a first added complex pointer $z_{g1}$ is formed from the frequencies $f_{n1}$ and a second added complex pointer $z_{g2}$ is formed from the frequencies $f_{n2}$. The length of the added complex pointers $z_g$ corresponds in each instance to the arithmetic sum of the lengths of the individual complex pointers $z_n$. The angle spanned by the first added complex pointer $z_{g1}$ and the second added complex pointer $z_{g2}$ corresponds to the angle $\alpha$.

The invention is based on the consideration of using a theoretical method for back calculating frequencies of a higher order to a $1^{st}$ order frequency to increase the accuracy of a pulse-type measurement signal.

The shaft signals consist of frequency components or, when considering the angle of the captured angle signal, order components. For a rotation speed of 50 Hz for example, the $1^{st}$ order is around 50 Hz, the $2^{nd}$ order around 100 Hz, etc. As the orders are already contained in the speed, the $1^{st}$ order is always around the rotation speed and the higher orders n around n-times the rotation speed. The sum of all the frequency components or order components considered gives the shaft signal. The different order frequencies are obtained by Fourier analysis of the shaft signal.

The invention utilizes the fact that the higher the order used, the greater the accuracy of the determination of the angle of twist. In the inventive method therefore phases of higher components are used and the $1^{st}$ order frequency is not taken into account for the measurement if interference frequencies occur in this range (e.g. network interference). A higher order frequency/phase cannot however be back calculated directly to 0° phase information, since it is not unique due to the periodicity of the angle function. Therefore a number of angles occur with a higher order frequency. A unique calculation of an angle is possible, by considering a number of higher order frequencies together. This is done by representing the higher order frequencies by means of complex pointers and adding them in a complex manner. The complex addition here brings about an averaging. The length of the added complex pointer corresponds to the arithmetic sum of the lengths of the individual complex pointers. The angle $\lambda$ of the added complex pointer now corresponds approximately to the angle $\alpha$, through which the subshafts are twisted in relation to one another.

The inventive method allows the angle between a first shaft section and a second shaft section to be calculated with minimized inaccuracy. This is achieved in particular by averaging the frequencies and leaving out error-prone components.

In one preferred form of the method, to determine the first added complex pointer $z_{g1}$ and the second added complex pointer $z_{g2}$, only the angles $\phi_n$ are used in each instance, at which the length of the first added complex pointer $z_{g1}$ or the second added complex pointer $z_{g2}$ corresponds uniquely to the arithmetic sum of the lengths of the individual complex pointers $z_n$. All other variants of pointer combinations originate during back calculation of the periodicity from false assumptions relating to reconstruction of the correct phase relation and produce an error-prone result.

In a further development of the method, to determine the first added complex pointer $z_{g1}$ and the second added complex pointer $z_{g2}$, frequencies $f_n$ with the influence of interference signals or measurement errors are not used. The $1^{st}$ order frequency is preferably not used here.

The first shaft signal and the second shaft signal expediently correspond respectively to a pulse-type shaft signal. The pulse-type shaft signal corresponds to the theoretical phases $\phi_n$ of the frequency components of a pulse-type shaft signal.

The first shaft section and the second shaft section are advantageously connected to one another by way of a clutch. Other releasable connections are however also possible.

The object is also achieved by an apparatus, on which the inventive method can be executed. Such an apparatus here can be a computer-aided measurement and evaluation unit, which can measure cyclical time differences and evaluate them according to the inventive method.

BRIEF DESCRIPTION OF THE DRAWINGS

An exemplary embodiment of the inventive method is described in more detail below with reference to figures, in which.

DETAILED DESCRIPTION OF INVENTION

Figure 1:
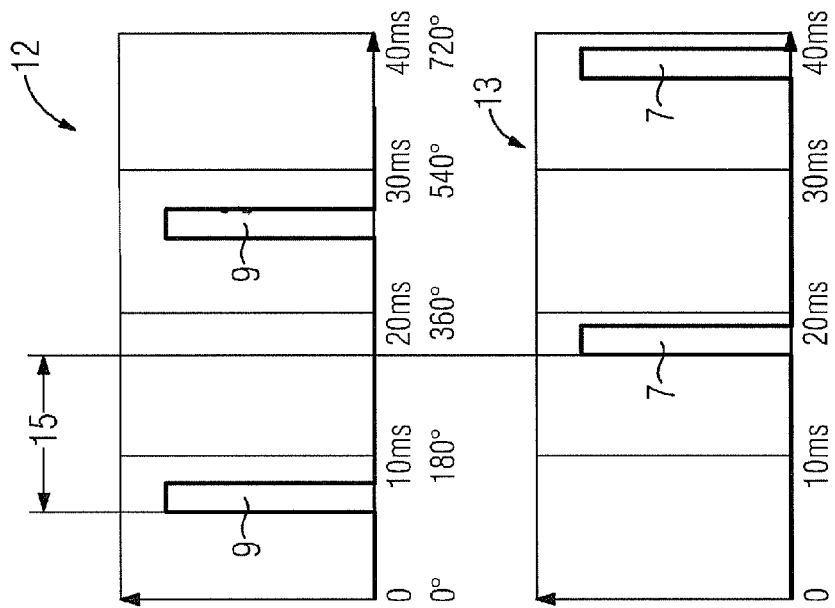
FIG. 1 shows step a) Measurement and determination of time signals and time differences
Figure 1:
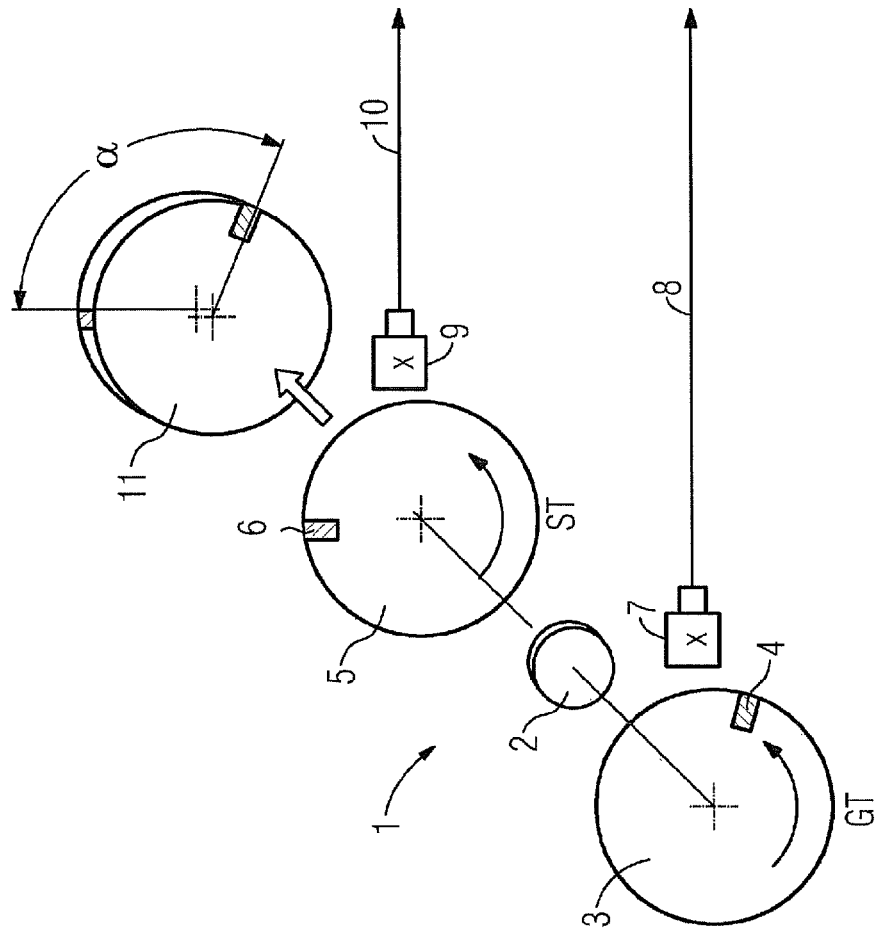

On the left FIG. 1 shows an exploded diagram of a shaft arrangement, as is commonly found in a gas and steam turbine installation for example. The gas turbine is connected to a steam turbine by way of a shaft 1. The shaft 1 consists of two subshafts, which are connected to one another by way of a releasable clutch 2. The first subshaft 3 is connected to the gas turbine and has a first notch 4, which marks the 0° position of the first subshaft. The second subshaft 5 is connected to the steam turbine and has a second notch 6, which marks the 0° position of the second subshaft 5. A first sensor 7 is disposed on the first subshaft 3 to capture a first measurement signal 8. A second sensor 9 is disposed on the second subshaft 5 to capture a second measurement signal 10.

The projection view 11 shows a slightly offset top view of the two subshafts. It can be seen that the 0° positions of the two subshafts are twisted through an angle $\alpha$ in relation to one another.

The measurement results of the two sensors are shown on the right in FIG. 1. The upper diagram 12 shows the measurement results of the second sensor 9. The lower diagram 13 shows the measurement results of the first sensor 7. The diagrams show the periodic rectangular responses. The angle of twist can be calculated from the propagation time displacement 15 of the two rectangular responses.

Figure 2:
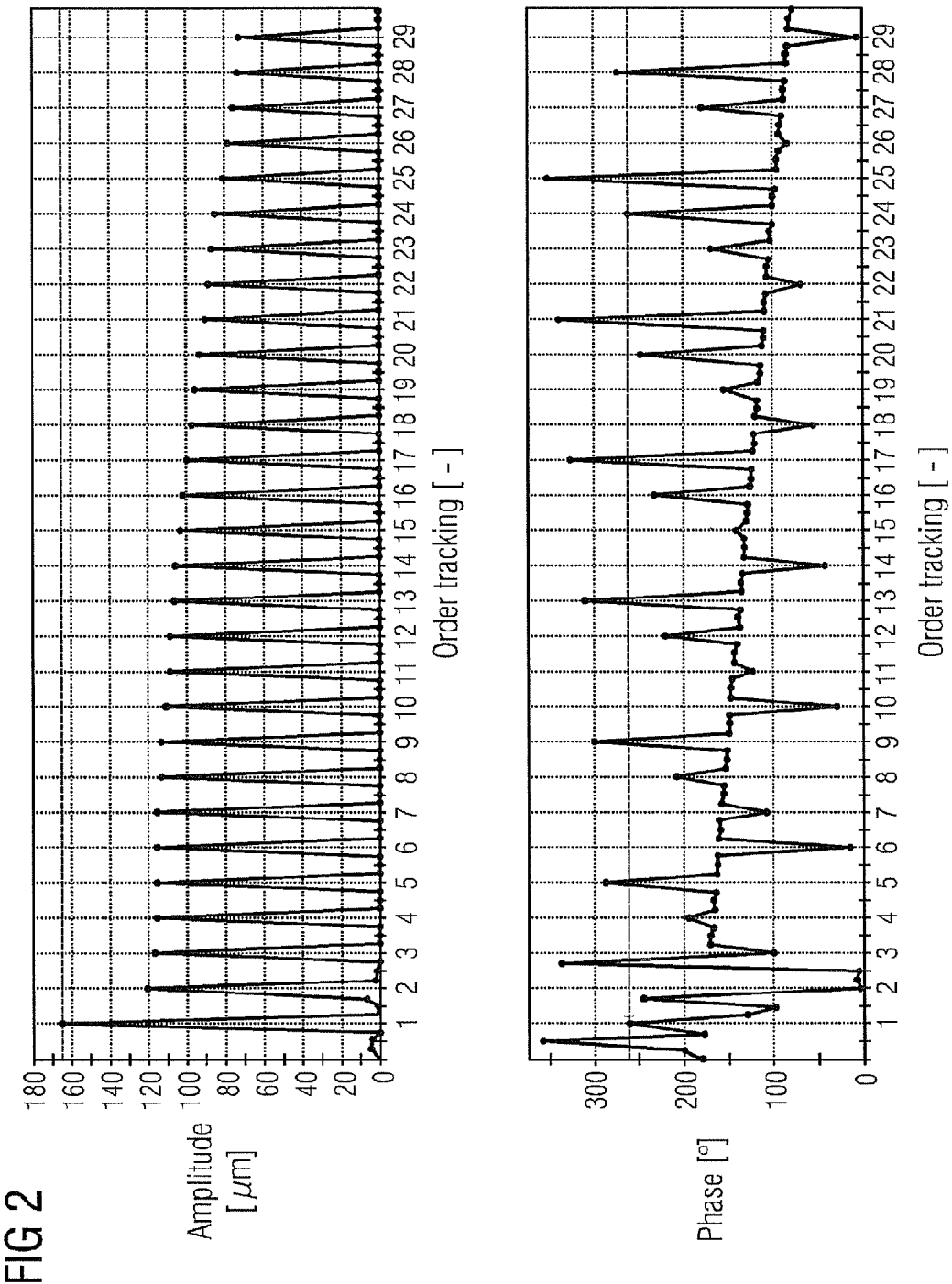
FIG. 2 shows order tracking

In FIG. 2 the upper diagram shows the amplitude of a shaft signal over order tracking. The lower diagram shows the phase over order tracking.

Figure 3:
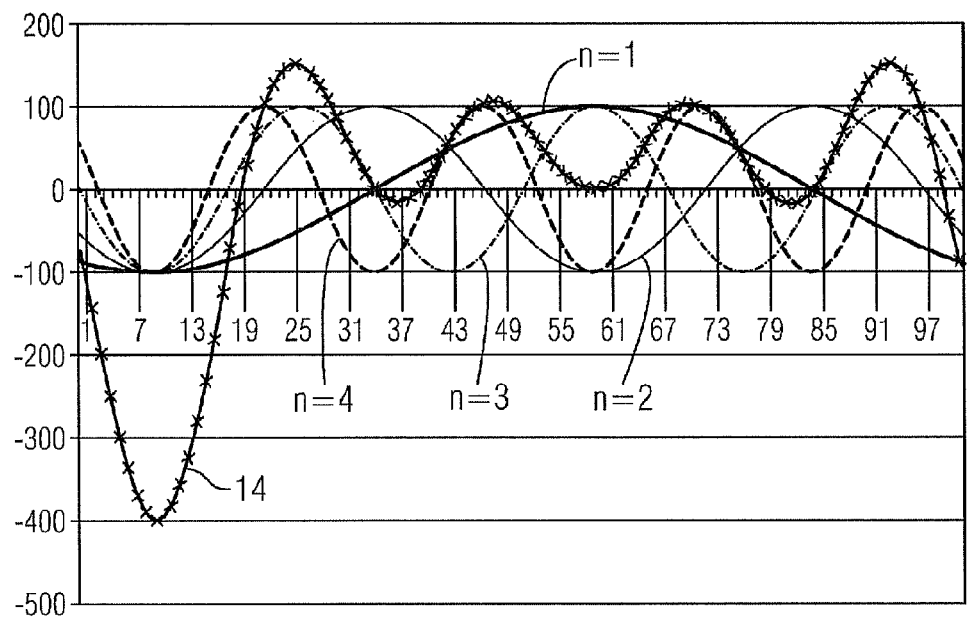
FIG. 3 shows step b) Simulation of the Fourier analysis of the shaft signal

In FIG. 3 a Fourier analysis is carried out using the example of one of the two pulse-type shaft signals. The first four harmonic oscillations are shown, in other words the theoretical position of the frequencies of the $1^{st}$ to $4^{th}$ orders n. The sum of all the frequency components forms the shaft signal 14. It can be seen that the frequencies of the $2^{nd}$ to $4^{th}$ orders have a higher periodicity than the frequency of the $1^{st}$ order.

Figure 4:
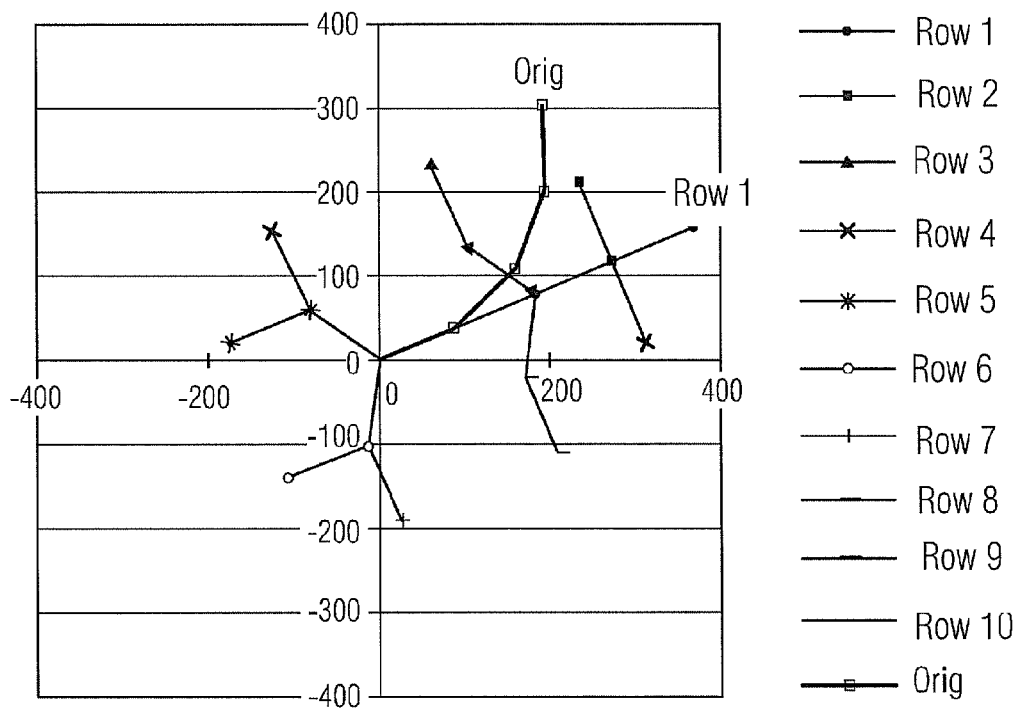
FIG. 4 shows step c) Determination of the angle

FIG. 4 shows the simulation of the back calculation to the $1^{st}$ order frequency. The row ORIG corresponds to the complex pointers of the frequencies of the first four orders without standardization. The row ROW 1 corresponds to the correct hypothesis for back calculation. The other rows are possible combinations of back calculation variants taking into account periodicity and produce false hypotheses relating to back calculation.

The invention claimed is:

1. A method for determining a first angle between a first shaft section and a second shaft section, the method performed by a computer processor, comprising:
   supplying a first shaft signal by a first 0° position of a first shaft section;
   supplying a second shaft signal by a second 0° position of a second shaft section;
   decomposing the first shaft signal and the second shaft signal into frequency components of harmonic oscillation using Fourier analysis,
      wherein a first plurality of frequencies is formed for the first shaft signal and a second plurality of frequencies is formed for the second shaft signal, the first and second plurality of frequencies are Banned respectively as complex pointers from an absolute value and a phase of an order, and
      wherein each pointer describes an angular velocity of the respective frequency;
   dividing a plurality of respective angles of the complex pointers by the respective order for the first plurality of frequencies and the second plurality of frequencies;
   forming standardized complex pointers; and
   adding the standardized complex pointers in a complex manner, so that a first added complex pointer is formed from the first plurality of frequencies and a second added complex pointer is formed from the second plurality of frequencies, a length of the added complex pointers corresponding in each instance to an arithmetic sum of the lengths of the individual complex pointers wherein an angle spanned by the first added complex pointer and the second added complex pointer corresponds to the first angle,
   wherein the decomposing, dividing, forming and adding are performed by a computer processor.

2. The method as claimed in claim 1,
   wherein in order to determine the first added complex pointer and the second added complex pointer only the plurality of respective angles are used in each instance, and
   wherein the length of the first added complex pointer or the second added complex pointer corresponds uniquely to the arithmetic sum of the lengths of the individual complex pointers.

3. The method as claimed in claim 1, wherein in order to calculate the first added complex pointer and the second added complex pointer, any individual frequency of the first and second plurality of frequencies influenced by an interference signal or a measurement error is not used.

4. The method as claimed in claim 3, wherein a plurality of $1^{st}$ order frequencies are not used.

5. The method as claimed in claim 1, wherein the first shaft signal and the second shaft signal correspond respectively to a pulse-type shaft signal.

6. The method as claimed in claim 1, wherein the first shaft section and the second shaft section are connected to one another by a clutch.

7. The method as claimed in claim 1, wherein the determination of the first shaft signal and of the second shaft signal takes place during rotation of the first shaft section and of the second shaft section.

8. An apparatus for carrying out a method for determining a first angle between a first shaft section and a second shaft section, comprising:
- a means for carrying out the method comprising the steps of:
  - supplying a first shaft signal by a first 0° position of a first shaft section,
  - supplying a second shaft signal by a second 0° position of a second shaft section,
  - decomposing the first shaft signal and the second shaft signal into frequency components of harmonic oscillation using Fourier analysis,
    - wherein a first plurality of frequencies is formed for the first shaft signal and a second plurality of frequencies is formed for the second shaft signal, the first and second plurality of frequencies are formed respectively as complex pointers from an absolute value and a phase of an order, and
    - wherein each pointer describes an angular velocity of the respective frequency,
  - dividing a plurality of respective angles of the complex pointers by the respective order for the first plurality of frequencies and the second plurality of frequencies,
  - forming standardized complex pointers, and
  - adding the standardized complex pointers in a complex manner, so that a first added complex pointer is formed from the first plurality of frequencies and a second added complex pointer is formed from the second plurality of frequencies, a length of the added complex pointers corresponding in each instance to an arithmetic sum of the lengths of the individual complex pointers wherein an angle spanned by the first added complex pointer and the second added complex pointer corresponds to the first angle.

9. The apparatus as claimed in claim 8, wherein the apparatus is a computer-aided measurement and evaluation unit.

10. The apparatus as claimed in claim 8,
wherein in order to determine the first added complex pointer and the second added complex pointer only the plurality of respective angles are used in each instance, and
wherein the length of the first added complex pointer or the second added complex pointer corresponds uniquely to the arithmetic sum of the lengths of the individual complex pointers.

11. The apparatus as claimed in claim 8, wherein in order to calculate the first added complex pointer and the second added complex pointer, any individual frequency of the first and second plurality of frequencies influenced by an interference signal or a measurement error is not used.

12. The apparatus as claimed in claim 11, wherein a plurality of 1st order frequencies are not used.

13. The apparatus as claimed in claim 8, wherein the first shaft signal and the second shaft signal correspond respectively to a pulse-type shaft signal.

14. The apparatus as claimed in claim 8, wherein the first shaft section and the second shaft section are connected to one another by a clutch.

15. The apparatus as claimed in claim 8, wherein the determination of the first shaft signal and of the second shaft signal takes place during rotation of the first shaft section and of the second shaft section.

\* \* \* \* \*

UNITED STATES PATENT AND TRADEMARK OFFICE
CERTIFICATE OF CORRECTION

PATENT NO. : 8,321,176 B2
APPLICATION NO. : 12/865211
DATED : November 27, 2012
INVENTOR(S) : Martin Hempl Page 1 of 1

It is certified that error appears in the above-identified patent and that said Letters Patent is hereby corrected as shown below:

Col. 4, line 31, Claim 1, remove [Banned] and insert --formed--

Signed and Sealed this
Twenty-sixth Day of February, 2013

Teresa Stanek Rea
*Acting Director of the United States Patent and Trademark Office*